(12) United States Patent
Kang et al.

(10) Patent No.: US 11,853,715 B2
(45) Date of Patent: Dec. 26, 2023

(54) FLOATING-POINT COMPUTATION WITH THRESHOLD PREDICTION FOR ARTIFICIAL INTELLIGENCE SYSTEM

(71) Applicant: International Business Machines Corporation, Armonk, NY (US)

(72) Inventors: Mingu Kang, Old Tappan, NJ (US); Seonghoon Woo, New York, NY (US); Eun Kyung Lee, Bedford Corners, NY (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 17/101,605

(22) Filed: Nov. 23, 2020

(65) Prior Publication Data
US 2022/0164163 A1    May 26, 2022

(51) Int. Cl.
G06F 7/483    (2006.01)
G06F 7/544    (2006.01)
(Continued)

(52) U.S. Cl.
CPC ............ *G06F 7/483* (2013.01); *G06F 7/5443* (2013.01); *G06N 3/04* (2013.01); *G06N 3/08* (2013.01)

(58) Field of Classification Search
CPC .................................. G06F 7/483; G06F 7/5443
See application file for complete search history.

(56) References Cited

U.S. PATENT DOCUMENTS 9,904,513 B2    2/2018    Maiyuran et al.
10,635,972 B1   4/2020    Le et al.
(Continued)

FOREIGN PATENT DOCUMENTS

WO    2019222724 A1    11/2019
WO    2022/106944 A1   5/2022

OTHER PUBLICATIONS

A. Krizhevsky et al., "Imagenet Classification with Deep Convolutional Neural Networks," Advances in Neural Information Processing Systems, Jan. 2012, vol. 25, No. 2, 9 pages.
(Continued)

*Primary Examiner* — Michael D. Yaary
(74) *Attorney, Agent, or Firm* — Erik Johnson; Ryan, Mason & Lewis, LLP

(57) ABSTRACT

A system comprises a floating-point computation unit configured to perform a dot-product operation in accordance with a first floating-point value and a second floating-point value, and detection logic operatively coupled to the floating-point computation unit. The detection logic is configured to compute a difference between fixed-point summations of exponent parts of the first floating-point value and the second floating-point value and, based on the computed difference, detect the presence of a condition prior to completion of the dot-product operation by the floating-point computation unit. In response to detection of the presence of the condition, the detection logic is further configured to cause the floating-point computation unit to avoid performing a subset of computations otherwise performed as part of the dot-product operation. Such techniques serve as a predictor that the avoided subset of computations would have resulted in a dot product of the two floating-point values being below a threshold value.

25 Claims, 8 Drawing Sheets

(51) Int. Cl.
*G06N 3/04* (2023.01)
*G06N 3/08* (2023.01)

(56) References Cited

U.S. PATENT DOCUMENTS

| | | | |
|---|---|---|---|
| 2002/0107900 | A1 | 8/2002 | Enenkel et al. |
| 2006/0248137 | A1* | 11/2006 | Landers ............... G06F 7/485 |
| | | | 708/620 |
| 2010/0031009 | A1 | 2/2010 | Muff et al. |
| 2016/0248439 | A1* | 8/2016 | Tanaka ............... H03M 7/6029 |
| 2018/0189638 | A1 | 7/2018 | Nurvitadhi et al. |
| 2018/0322607 | A1* | 11/2018 | Mellempudi ......... G06F 7/5443 |
| 2018/0349758 | A1 | 12/2018 | Pan et al. |
| 2019/0079768 | A1 | 3/2019 | Heinecke et al. |
| 2019/0294415 | A1 | 9/2019 | Kaul et al. |
| 2019/0339937 | A1 | 11/2019 | Lo et al. |
| 2019/0340499 | A1* | 11/2019 | Burger ................. G06N 3/084 |
| 2020/0150923 | A1* | 5/2020 | Muralimanohar .... G06F 7/5443 |

OTHER PUBLICATIONS

N. Wang et al., "Training Deep Neural Networks with 8-Bit Floating Point Numbers," 32nd Conference on Neural Information Processing Systems (NeurIPS), Dec. 19, 2018, 10 pages.

A. Pedram et al., "Algorithm, Architecture, and Floating-Point Unit Codesign of a Matrix Factorization Accelerator," IEEE Transactions on Computers, vol. 63, No. 8, pp. 1854-1867.

Y. Lin et al., "PredictiveNet: An Energy-Efficient Convolutional Neural Network Via Zero Prediction," IEEE International Symposium on Circuits and Systems (ISCAS), Sep. 25, 2017, 4 pages.

X. Long et al., "A Novel Low-Bit Quantization Strategy for Compressing Deep Neural Networks," Computational Intelligence and Neuroscience, Feb. 18, 2020, vol. 2020, 7 pages.

P. Mell et al., "The NIST Definition of Cloud Computing," U.S. Department of Commerce, Computer Security Division, National Institute of Standards and Technology, Special Publication 800-145, Sep. 2011, 7 pages.

J. Koenig et al., "A Hardware Accelerator for Computing an Exact Dot Product," 2017 IEEE 24th Symposium on Computer Arithmetic, Jul. 24-26, 2017, 8 pages.

Wikipedia, "Floating-point Arithmetic," https://en.wikipedia.org/w/index.php?title=Floating-point_arithmetic&oldid=981446173, Oct. 2, 2020, 24 pages.

IEEE Computer Society, "IEEE Standard for Floating-Point Arithmetic," in IEEE Std 754-2019 (Revision of IEEE 754-2008), Jul. 22, 2019, 84 pages.

U.S. Appl. No. 16/797,587, filed Feb. 2020.

International Search Report and Written Opinion of PCT/IB2021/060128 dated Feb. 10, 2022, 11 pages.

Great Britain Examination Report for Application No. GB2306201.1 dated May 26, 2023, 4 pages.

Australian Examination Report for Application No. AU2021382976, dated Sep. 8, 2023, 2 pages.

* cited by examiner

FIG. 1A
100
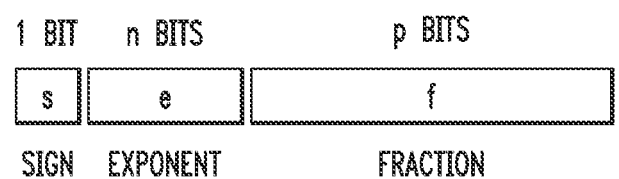
FIG. 1B
110
$$\text{VALUE}(x) = (-1)^s * 2^{[e]} * (1.f)$$
FIG. 1C
120

200

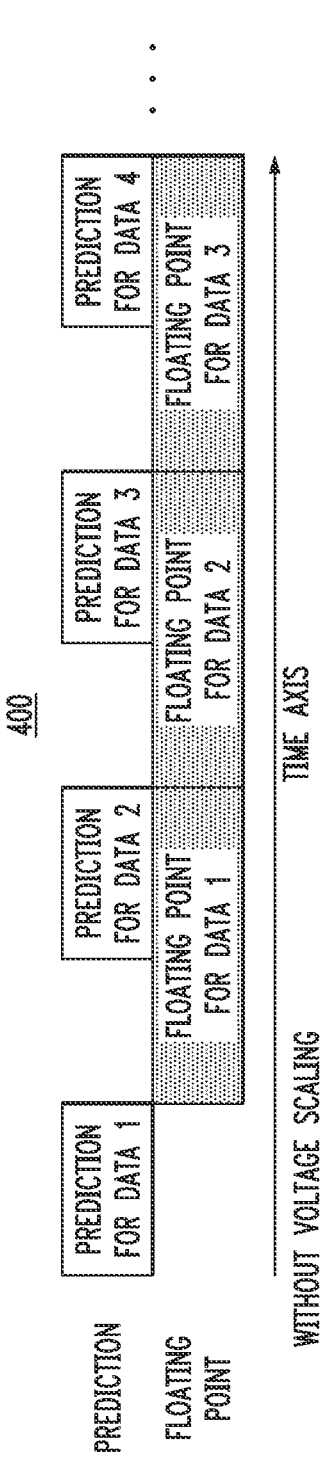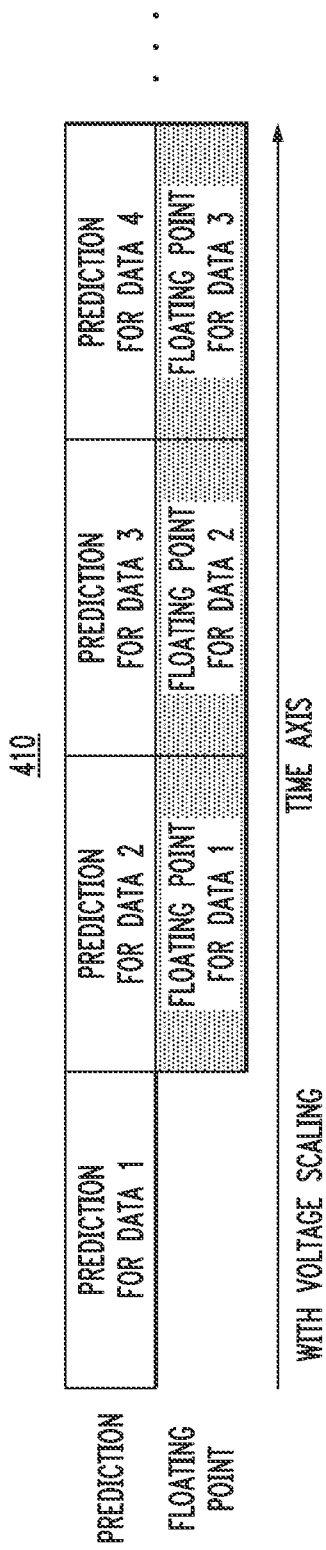

500

600

FLOATING-POINT COMPUTATION WITH THRESHOLD PREDICTION FOR ARTIFICIAL INTELLIGENCE SYSTEM

BACKGROUND

Machine learning algorithms, considered examples of artificial intelligence systems, are becoming widely used in computational applications that benefit by improved iterative computation accuracy. A neural network-based algorithm is one of the most widely used types of machine learning algorithms. A neural network is a model that recognizes underlying relationships in a set of data through a process that mimics the manner in which the human brain operates. The neural network model is first trained using a training data set (training stage), and then a trained neural network model is used to recognize relationships in a target data set (inference stage). While the inference stage may rely on low-precision fixed-point arithmetic computations, the training stage typically requires floating-point arithmetic computations.

SUMMARY

Embodiments of the invention provide improved techniques for performing floating-point computations in an artificial intelligence system.

In one illustrative embodiment, a system comprises a floating-point computation unit configured to perform a dot-product operation in accordance with a first floating-point value and a second floating-point value, and detection logic operatively coupled to the floating-point computation unit. The detection logic is configured to compute a difference between fixed-point summations of exponent parts of the first floating-point value and the second floating-point value and, based on the computed difference, detect the presence of a condition prior to completion of the dot-product operation by the floating-point computation unit. In response to detection of the presence of the condition, the detection logic is further configured to cause the floating-point computation unit to avoid performing a subset of computations otherwise performed as part of the dot-product operation.

Further illustrative embodiments are respectively provided in forms of an apparatus with a processor and a memory configured to execute instruction code, a method configured to perform the detecting and causing steps, and a non-transitory processor-readable storage medium having embodied therein executable instruction code that when executed by a processor causes the processor to perform the above steps.

Advantageously, by way of one example, illustrative embodiments predict a negative inner product output, or an acceptably small positive inner product output, before the inner product is computed in order to save computational overhead at an early stage with respect to hardware used to support the computation algorithm.

These and other features and advantages of embodiments described herein will become more apparent from the accompanying drawings and the following detailed description.

BRIEF DESCRIPTION OF THE DRAWINGS

FIG. 1A depicts a field format of a floating-point number with which one or more illustrative embodiments can be implemented.

FIG. 1B depicts an arithmetic representation of a floating-point number with which one or more illustrative embodiments can be implemented.

FIG. 1C depicts a computing kernel associated with a floating-point dot-product computation with which one or more illustrative embodiments can be implemented.

FIGS. 4A and 4B respectively depict a processing flow without voltage scaling and a processing flow with voltage scaling according to illustrative embodiments.

DETAILED DESCRIPTION

Figure 2:
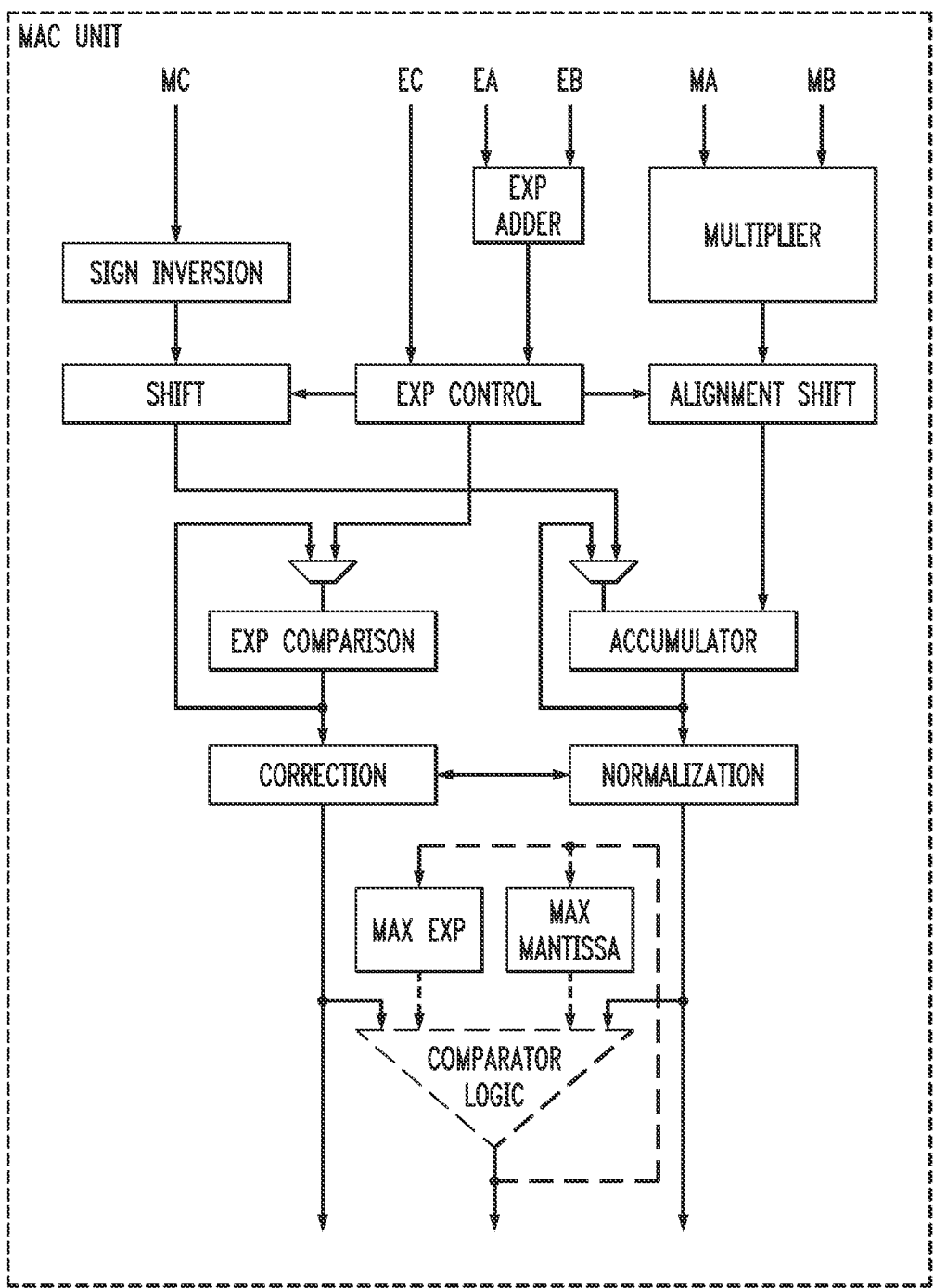
FIG. 2 depicts floating-point multiplier-accumulator logic with which one or more illustrative embodiments can be implemented.

Illustrative embodiments may be described herein with reference to exemplary computing environments, cloud infrastructure, data repositories, data centers, data processing systems, information processing systems, computer systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud platform," "cloud computing environment," "cloud infrastructure," "data repository," "data center," "data processing system," "information processing system," "computer system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above in the background section, the training stage of a neural network model used in an artificial intelligence (e.g., machine learning) system typically requires floating-point arithmetic computations. By way of one example, such floating-point arithmetic may include computations defined in the Institute of Electrical and Electronics Engineers (IEEE) standard entitled "IEEE 754-2019: IEEE Standard for Floating-Point Arithmetic." The IEEE 754 standard specifies arithmetic formats and methods for binary (base 2) and decimal (base 10) floating-point arithmetic in computer programming environments. The IEEE indicates that an implementation of a floating-point system conforming to this standard may be realized entirely in software, entirely in hardware, or in any combination of software and hardware.

IEEE 754 defines a half precision format which uses 16 bits per number, a single precision format with 32 bits per number, and a double precision format with 64 bits per number. Each format includes a sign 's', an exponent 'e', and a mantissa represented as a fractional value 'f' (e.g., numbers are normalized by assuming a leading 1 bit followed by a fractional part which includes significant values to the right of the decimal point). Thus, the mantissa is the part of a floating-point number that represents the significant digits of that number, and that is multiplied by the base raised to the exponent to give the actual value of the number.

FIG. 1A depicts a field format 100 of a floating-point number consistent with the IEEE 754 standard and with which one or more illustrative embodiments can be implemented. Variables n and p respectively denoting the number of bits for the exponent part and the fractional part are dependent on the precision selected. FIG. 1B depicts an arithmetic representation 110 of a floating-point number, denoted as value(x), consistent with the field format 100 in FIG. 1A and with which one or more illustrative embodiments can be implemented.

One floating-point computation that is performed in the training stage of a neural network model used in an artificial intelligence system is a floating-point dot-product computation. The dot-product computation is typically performed in a multiplier-accumulator (MAC) unit of the artificial intelligence system. A dot product is an algebraic operation that inputs two equal length sequences of numbers (e.g., two floating-point numbers) and returns a single number. More particularly, the dot product is the sum of the products of the corresponding entries of the two sequences of numbers. In the case when the two input numbers are vectors, the result (also referred to as the inner product) of the dot-product operation is a scalar value.

Further, a computing kernel in modern artificial intelligence systems takes the inner product (result of the floating-point dot-product operation) and applies a rectified linear unit (Relu) function to the inner product. FIG. 1C depicts a computing kernel 120 that applies a Relu function to an inner product y computed for two floating point values x and w ($y=\vec{x}\cdot\vec{w}$). The Relu function only passes positive inputs, i.e., y is output from the Relu function so long as y is greater than zero, otherwise the Relu function outputs a zero.

It is realized herein that it would be highly energy-efficient if a negative value could be detected even before computing the entire dot-product $\vec{x}\cdot\vec{w}$) so that an output of zero could be provided without fully computing this inner product. Illustrative embodiments provide techniques to predict such a negative inner product output before the inner product is computed (i.e., before the inner product computation is completed) in order to save computational overhead at an early stage with respect to hardware used to support the computation algorithm.

Recall, as explained above and illustrated in FIGS. 1A and 1B, that a floating-point number is represented with three fields: sign (s), exponent (e), and fractional (f). In the case of the IEEE 754 half precision format, e.g., s=1 bit, e=5 bits, f=10 bits. The floating-point number is represented as value (x)=$(-1)^s * 2^{[e]} * (1 \cdot f)$ for normal numbers. As is evident, the magnitude of the value dominantly depends on the smaller number of bits of 'e', while the longer bit stream 'f' serves to fine-tune the magnitude of the value. For example, the magnitude of the number x is in the range of $2^{[e]} \leq |x| < 2^{[e+1]}$ regardless of the value of 'f'. It is realized herein that this property in accordance with illustrative embodiments advantageously provides significant opportunity for zero-prediction in the dot-product computation.

The product of two floating-point numbers X and Y are bounded as follows:

$$X=(-1)^s * 2^{[ex]} * (1 \cdot fx) => 2^{[ex]} \leq |X| < 2^{[ex+1]}$$

$$Y=(-1)^s * 2^{[ey]} * (1 \cdot fy) => 2^{[ey]} \leq |Y| < 2^{[ey+1]}$$

$$\therefore 2^{[ex+ey]} \leq |XY| < 2^{[ex+ey+2]}$$

It is further realized herein in accordance with illustrative embodiments that computing the maximum and minimum range of the product does not require multiplication, but just one fixed-point addition of the exponent values for the two floating-point values X and Y, i.e., ex+ey. For a dot-product computation, many (N) such products are summed, e.g., $\sum_{i=1}^{N} X_i Y_i$.

As such, positive product groups ($s_p$) and negative product groups ($s_n$) can be distinguished.

The range of the sum of positive and negative groups are as follows:

Sum of positive products:

$$\sum_{i \in S_p}^{N} 2^{(ex_i+ey_i)} \leq \sum_{i \in S_p}^{N} X_i Y_i < \sum_{i \in S_p}^{N} 2^{(ex_i+ey_i+2)}$$

Sum of negative products:

$$-\sum_{i \in S_n}^{N} 2^{(ex_i+ey_i+2)} \leq \sum_{i \in S_n}^{N} X_i Y_i < -\sum_{i \in S_n}^{N} 2^{(ex_i+ey_i)}$$

Therefore, in illustrative embodiments, to confirm that the total product $$\sum_{i}^{N} X_i Y_i < 0,$$

the following condition is checked:

$$\sum_{i \in S_p}^{N} 2^{(ex_i+ey_i+2)} - \sum_{i \in S_n}^{N} 2^{(ex_i+ey_i)} < 0 \qquad (1)$$

Note that the required computation in the above equation (1) only involves fixed-point summations without expensive multiplication or floating-point computation. Advantageously, with this computationally inexpensive pre-check, almost 50 percent (%) of computation (when a negative number occurs) is avoided. If the number turns out to be a positive number, then normal floating-point computation proceeds.

As mentioned above, floating-point dot-product computations are typically performed in a MAC hardware unit associated with an artificial intelligence system. FIG. 2 depicts floating-point multiplier-accumulator logic associated with a MAC unit 200 with which one or more illustrative embodiments can be implemented. A MAC unit combines three values A, B, and C by adding or subtracting value C to or from the dot product of the values A and B. In the case of floating-point values, the MAC unit 200 processes inputs EA, EB and EC where E refers to the respective exponent part of the values A, B and C, and inputs MA, MB and MC where M refers to the respective mantissa (fractional) part of the values A, B and C. The floating-point MAC unit 200 is relatively complex including alignment logic, adder logic, multiplier logic, shifter logic, comparator logic, as well as other functional logic (as illustrated in FIG. 2). One ordinarily skilled in the art will understand the conventional logic operations of a multiplier-accumulator, such as floating-point MAC unit 200, which are therefore not explained in further detail herein.

Assume that the fixed-point addition energy is 10% of at floating-point based MAC operation, then it is realized herein that about 40% of MAC computation can be skipped by predicting the negative number with 10% prediction overhead. On the other hand, if the accumulated number turns out not to meet the pre-check condition, 10% of prediction overhead is spent for nothing. Thus, 0.4*(100% savings−10% overhead)+0.6*(−10% overhead)=30% energy savings.

In certain circumstances, it is realized herein that equation (1) can be more conservative than necessary or desired because the maximum possible magnitude of positive products is compared with the minimum possible magnitude of negative products. As such, in an alternative embodiment, the pre-check condition is relaxed by replacing the "0" in the righthand term of equation (1) with a threshold "Th" as depicted below in equation (2):

$$\sum_{k \in S_p}^{N} 2^{(ex_i+ey_i+2)} - \sum_{k \in S_n}^{N} 2^{(ex_i+ey_i)} < Th \quad (2)$$

It is to be understood that Th>0 and the magnitude of Th is generally set to be relatively small. Thus, though the left term is a positive number, if it is very close to zero, the computation can be skipped. By controlling the Th value, higher energy efficiency is achieved at the cost of acceptably lower accuracy. That is, based on the setting of Th, if 10% of computations can additionally be avoided, the energy savings is 0.5*(100% savings−10% overhead)+0.5*(−10% overhead)=40% energy savings.

Figure 3:
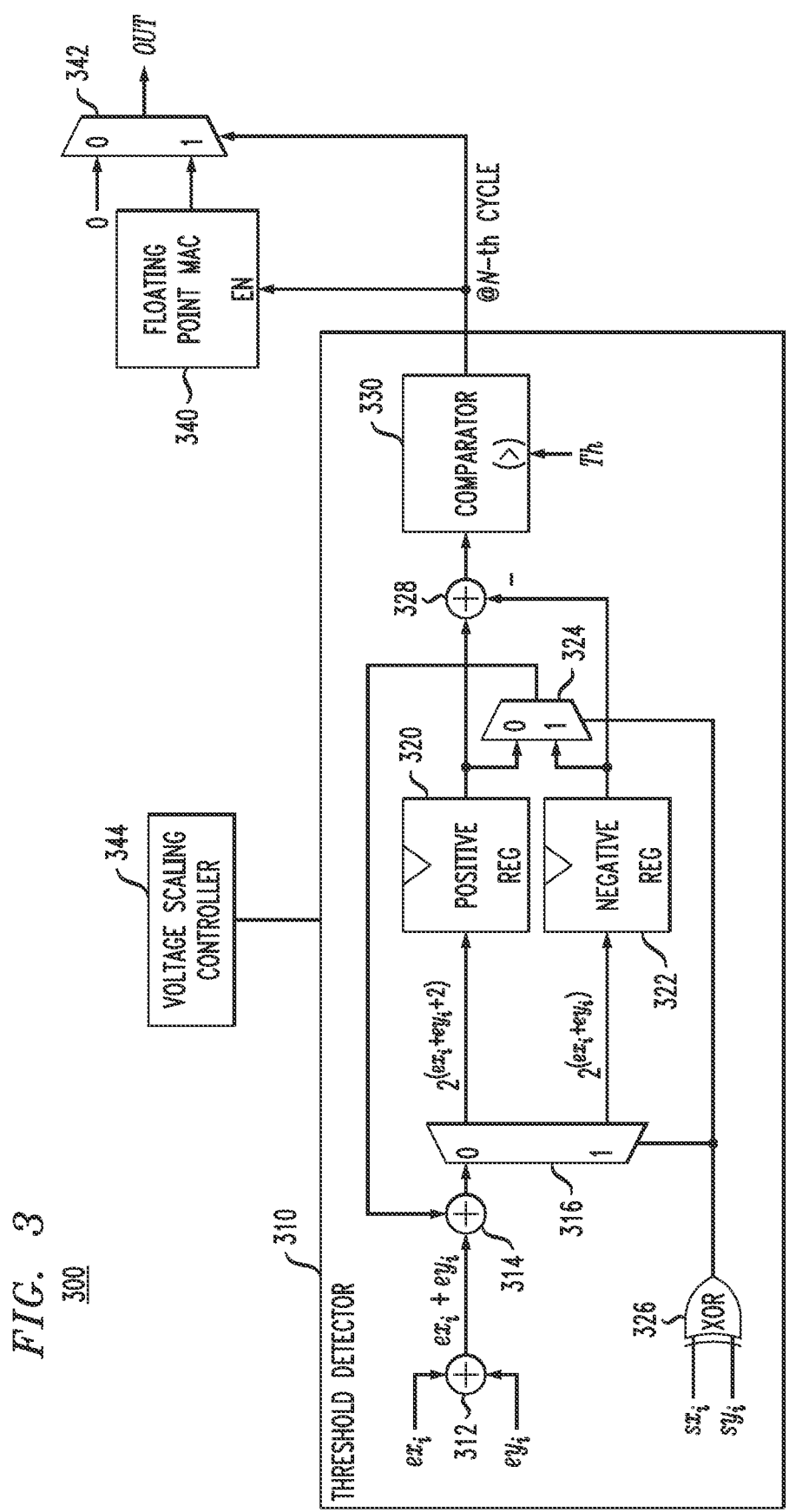
FIG. 3 depicts threshold detection logic for a floating-point dot-product computation according to an illustrative embodiment.

FIG. 3 depicts a logic implementation 300 of threshold detection for a floating-point dot-product computation according to an illustrative embodiment. Logic implementation 300 represents one illustrative embodiment of a hardware implementation of equation (2) above. Alternative embodiments may have other logic implementations.

As shown, logic implementation 300 comprises threshold detector 310 (detection logic) operatively coupled to a floating-point MAC unit 340 which is operatively coupled to a multiplexer 342. Threshold detector 310 comprises logic components including an adder 312, an adder 314, a demultiplexer 316, a register 320, a register 322, a multiplexer 324, an exclusive OR (XOR) gate 326, an adder 328, and a comparator 330. Reference to data inputs, data outputs, selection bits, control bits (or digital signals), etc., as being input and/or output from given logic components assumes that the given logic component has corresponding terminals that enable connectivity with other logic components to receive such inputs and/or send such outputs.

Recall that, as explained above, computing the maximum and minimum range of the product of two floating-point values X and Y does not require multiplication, but just one addition of the exponent values for the two floating-point values X and Y, i.e., ex+ey, and that for a dot-product computation, many (N) such products are summed, e.g., $\sum_{i=1}^{N} X_i Y_i$.

Thus, as shown in threshold detector 310 of FIG. 3, each corresponding pair of exponent bits (exponent parts) for X and Y, $ex_i$ and $ey_i$, is input to adder 312, such that the output of adder 312 is $ex_i+ey_i$. The output of adder 312 is input to adder 314 along with an output of multiplexer 324. The output of adder 314 is input to the demultiplexer 316.

Demultiplexer 316 generates $2^{(ex_i+ey_i+2)}$ on a first output which represents positive results and generates $2^{(ex_i+ey_i)}$ on a second output which represents negative results. Positive results are input to register 320 and negative results are input to register 322. Further, the positive results are output from positive register 320 and the negative results from register 322, and both are input to multiplexer 324 which generates an output that serves as an input to adder 314 as mentioned above.

As further shown in FIG. 3, XOR gate 326 receives as input $sx_i$ and $sy_i$ which are the sign bits for the floating-point values X and Y, respectively. When sx and sy are different, this means the sign of the product of X and Y is negative. Thus, the value is accumulated with the value in the negative register 322. If sx and sy are the same, this means the sign of the product of X and Y is positive, so the value is accumulated with the value in the positive register 320. Note that the output of XOR gate 326 is therefore used to control demultiplexer 316 and multiplexer 324 as appropriate.

The positive results from positive register 320 and the negative results from register 322 are also input to adder 328 and the output of adder 328 is checked in comparator 330 against the threshold Th. This is where the pre-check condition of equation (2) is determined. The output of comparator 330 is provided as an input to EN of floating-point MAC unit 340, and as a control signal to multiplexer 342 which has a first input of zero and a second input that is the output of floating-point MAC unit 340. Note that EN represents an enabling switch for floating-point MAC unit 340 such that floating-point MAC unit 340 operates only when the output of comparator 330 is a logic 1 (EN=1). Thus, assuming floating-point MAC unit 340 is configured as shown in floating-point MAC unit 200 in FIG. 2, the input values (i.e., EA, EB, MA, MB . . . ) will not be updated in the input register if EN=0. In this manner, the circuitry of unit 200 in FIG. 2 will be inactive and maintain the previous computation status.

Multiplexer 342 represents the Relu function described above. Thus, if $$\sum_{k \in S_p}^{N} 2^{(ex_i+ey_i+2)} - \sum_{k \in S_n}^{N} 2^{(ex_i+ey_i)}$$

is less than threshold Th, then the output of multiplexer 342 is zero, otherwise, the output of the floating-point MAC unit 340 is selected as the output of multiplexer 342. Recall that, in some embodiments, threshold Th can be zero, while in other embodiments, it can be some relatively small acceptable positive number. By way of example only, a small acceptable positive number may be a value smaller than about 1% of the maximum value of the dot product.

In additional embodiments, it is to be appreciated that the circuitry in threshold detector 310 can be implemented with voltage scaling functionality such that the threshold detector 310 operates with a lower than typical supply voltage to save energy consumption. Such voltage scaling functionality is controlled by voltage scaling controller 344. Controller 344 is configured to enable or disable the voltage scaling functionality as needed or desired.

FIGS. 4A and 4B respectively depict a processing flow 400 without voltage scaling and a processing flow 410 with voltage scaling according illustrative embodiments. The processing flows 400 and 410 correspond to processing of sequential data (data 1, data, 2, data 3, data 4, etc.) associated with threshold detector 310 and floating-point MAC unit 340. For example, as floating-point MAC unit 340 performs computations for given data (data 1), threshold detector 310 performs the prediction (based on threshold detection) for the next data (data 2), and so on.

As the prediction stage computation performed by the threshold detector 310 is relatively simple, the processing delay is relatively small compared to the processing delay associated with the floating-point processing of the MAC unit, e.g., this relative processing time difference is evident in FIG. 3A. Thus, voltage scaling can be applied for the prediction operation, e.g., voltage scaling controller 344 causes a percent reduction of the logic supply voltage VDD (operating or reference voltage) supplied to the circuitry of threshold detector 310. In some embodiments, VDD is reduced by 30% of the typical (regular) voltage operating level. The reduced voltage causes the threshold detector 310 to operate proportionately slower, i.e., increases processing delay. Then, the time period (time delay) for floating point computation can also be fully utilized by the prediction stage as depicted in the processing flow 410 of FIG. 4B. For example, the processing time for the prediction for data 2 is slowed to take all or most of the processing time for the floating-point computation for data 1.

In some embodiments, by reducing the VDD for the prediction operation, the overhead is reduced by half (0.7*0.7=0.49 by eq. Energy=$C*V_{DD}^2$) resulting in energy savings of 45%. Since deep neural networks consist of multiple (e.g., up to 50) layers, and each layer includes convolution, optional batch normalization, and a Relu function, such energy savings can be significant. Scaling of VDD can be applied by controller 344 using any typical voltage control mechanism.

Figure 5:
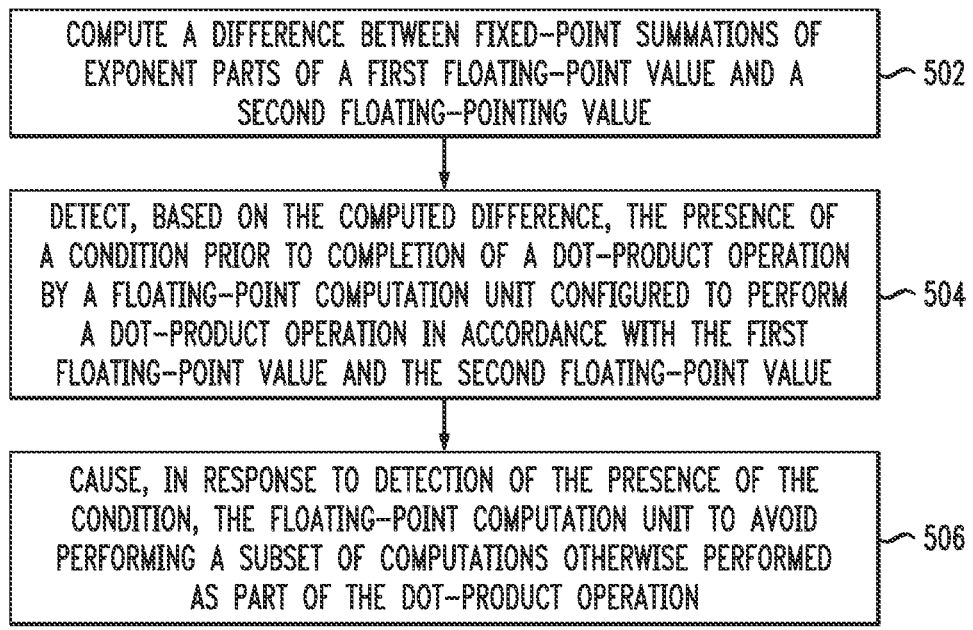
FIG. 5 depicts a methodology for threshold detection logic for a floating-point dot-product computation according to an illustrative embodiment.

FIG. 5 depicts a methodology 500 for threshold detection for a floating-point dot-product computation according to an illustrative embodiment. It is to be appreciated that methodology 500 can be performed, for example, by a system that includes logic implementation 300 of FIG. 3. However, in alternative embodiments, methodology 500 can be performed by other systems configured to perform the steps of the methodology.

Step 502 computes a difference between fixed-point summations of exponent parts of a first floating-point value and a second floating-point value.

Step 504 detects, based on the computed difference, the presence of a condition prior to completion of a dot-product operation by a floating-point computation unit configured to perform a dot-product operation in accordance with the first floating-point value and the second floating-point value.

Step 506 causes, in response to detection of the presence of the condition, the floating-point computation unit to avoid performing a subset of computations otherwise performed as part of the dot-product operation.

Figure 6:
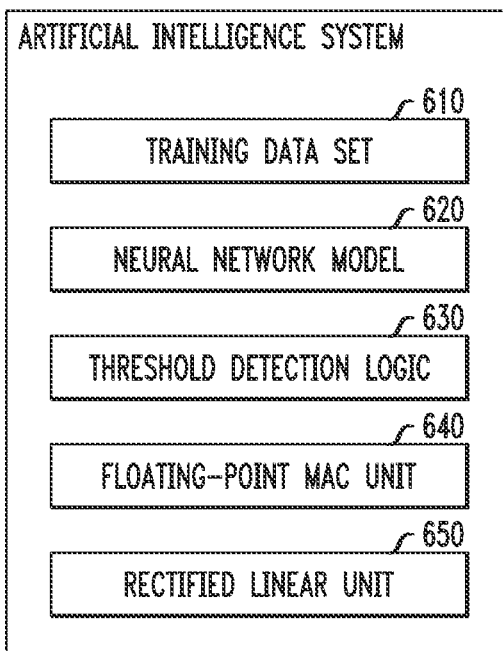
FIG. 6 depicts an exemplary implementation of an artificial intelligence system according to an illustrative embodiment.

FIG. 6 depicts an exemplary implementation of an artificial intelligence system 600 according to an illustrative embodiment. As shown, system 600 comprises a training data set 610, a neural network model 620, threshold detection logic 630, a floating-point MAC unit 640, and a rectified linear unit 650. It is to be appreciated that with respect to the exemplary hardware implementations depicted in FIG. 3 and described above, adder 312, adder 314, demultiplexer 316, register 320, register 322, multiplexer 324, XOR gate 326, adder 328, comparator 330 and controller 344 can be implemented as part of threshold detection logic 630. Further, floating-point MAC unit 340 can be implemented by floating-point MAC unit 640. Still further, multiplexer 342 can be implemented by rectified linear unit 650. It is to be understood that threshold detection logic 630, floating-point MAC unit 640, and rectified linear unit 650 are used to perform computations during the training of neural network model 620 based on training data set 610.

In one exemplary embodiment, threshold detection logic 630, floating-point MAC unit 640, and rectified linear unit 650 of artificial intelligence system 600 are implemented by one or more application-specific integrated circuits (ASICs). ASICs are integrated circuit (IC) chips or devices customized for a particular purpose that comprise logic (e.g., circuitry, processors, memory, etc.) that are programmed with executable program code (e.g., instruction code, computer program code, etc.) or otherwise configured for the particular purpose. In this exemplary case, the particular purpose is the implementation and execution of an artificial intelligence system (e.g., machine learning algorithm) and, more specifically, the training stage of neural network model 620 using training data set 610. An ASIC is also considered a system-on-chip (SoC). Some ASIC implementations that can be used with one or more illustrative embodiments employ cell libraries of user selectable basic logic functions (e.g., a multiplexer, a comparator, etc. that are comprised of multiple VLSI transistor devices to provide various functions such as switching, comparing, etc.) to enable configuration (and reconfiguration) of the system.

It is to be further appreciated that artificial intelligence system 600 and the parts thereof can be realized in alternative circuitry/processor-based technology such as technology including one or more multi-core central processing units (CPUs), one or more graphics processing units (GPUs), and one or more field programmable gate arrays (FPGAs). In some embodiments, artificial intelligence system 600 can be implemented as a combination of two or more circuitry/processor-based technologies (e.g., ASIC, CPU, GPU, FPGA, etc.).

The techniques depicted in FIGS. 1-6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIGS. 1-6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
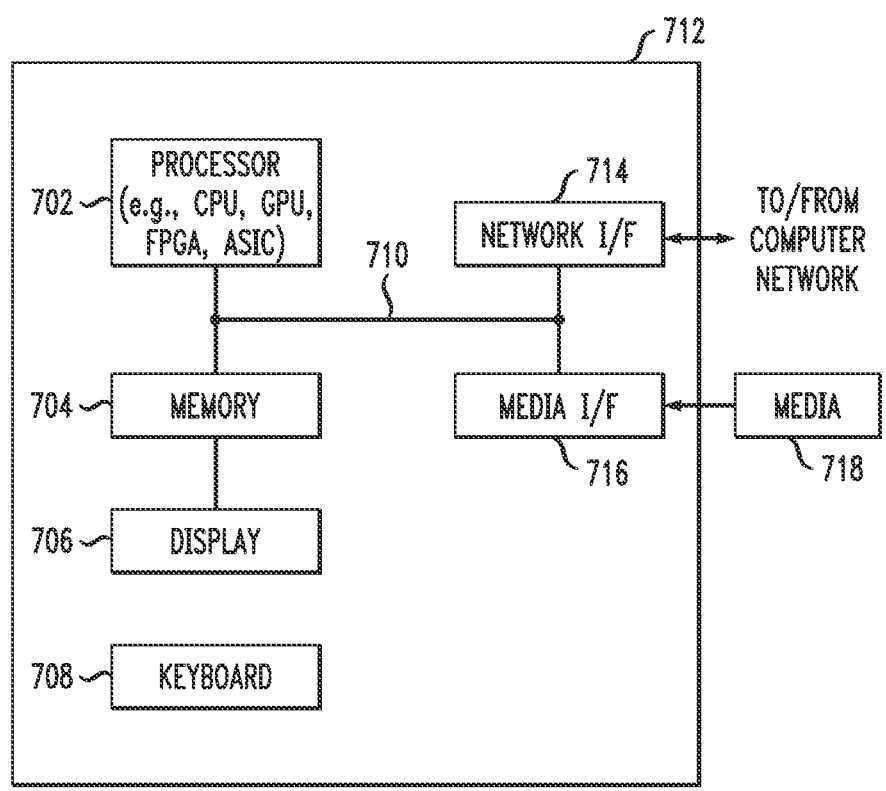
FIG. 7 depicts an exemplary processor system according to an illustrative embodiment.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a multi-core CPU, GPU, FPGA and/or other forms of processing circuitry such as one or more ASICs. Further, the term "processor" may refer to more than one individual processor. The term "memory" is intended to include memory associated with a processor (e.g., CPU, GPU, FPGA, ASIC, etc.) such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICs), functional circuitry, an appropriately programmed digital computer with associated memory, and the like. Given the teachings of the invention provided herein, one of ordinary skill in the related art will be able to contemplate other implementations of the components of the invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
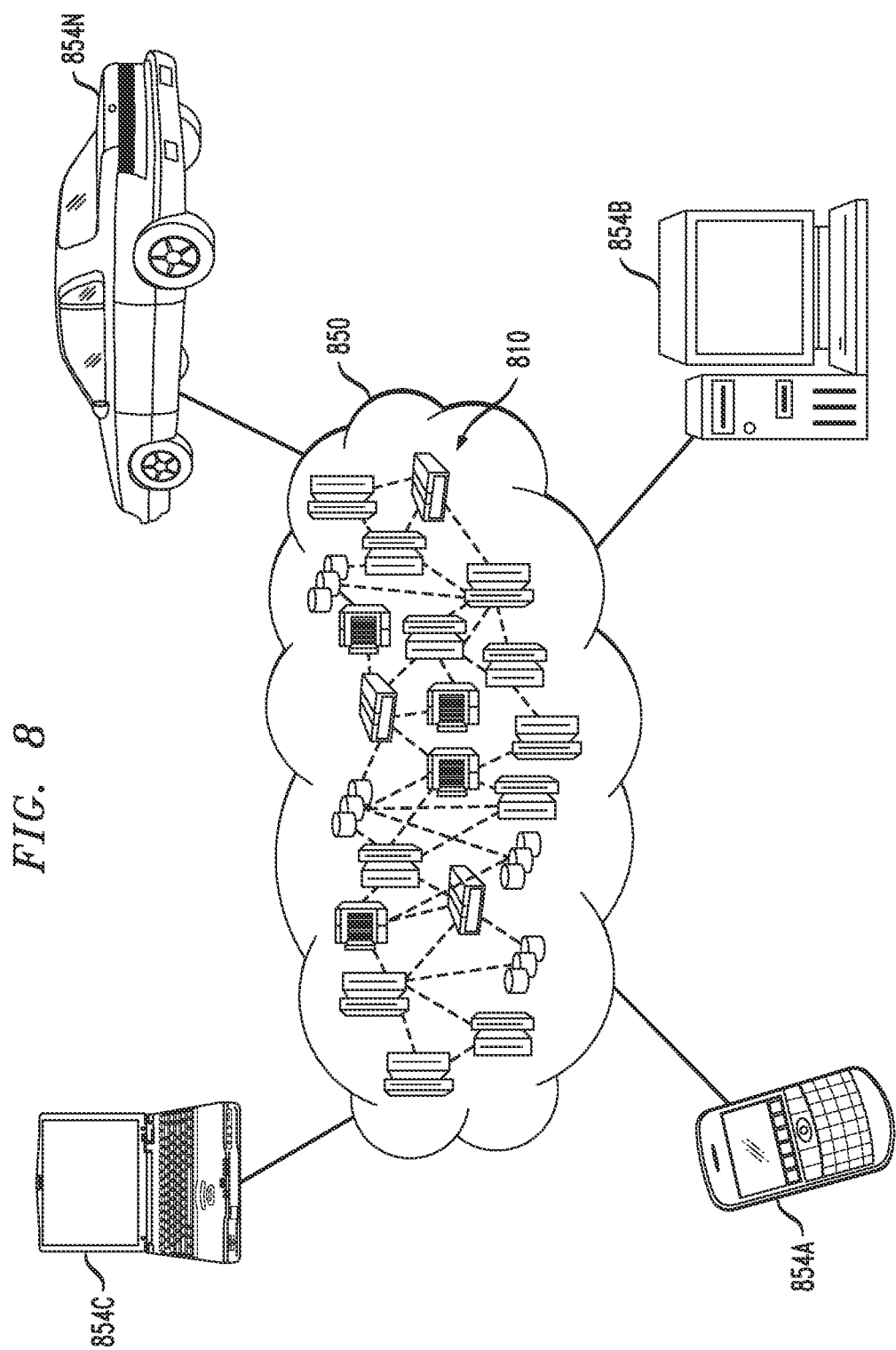
FIG. 8 depicts a cloud computing environment according to an illustrative embodiment.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
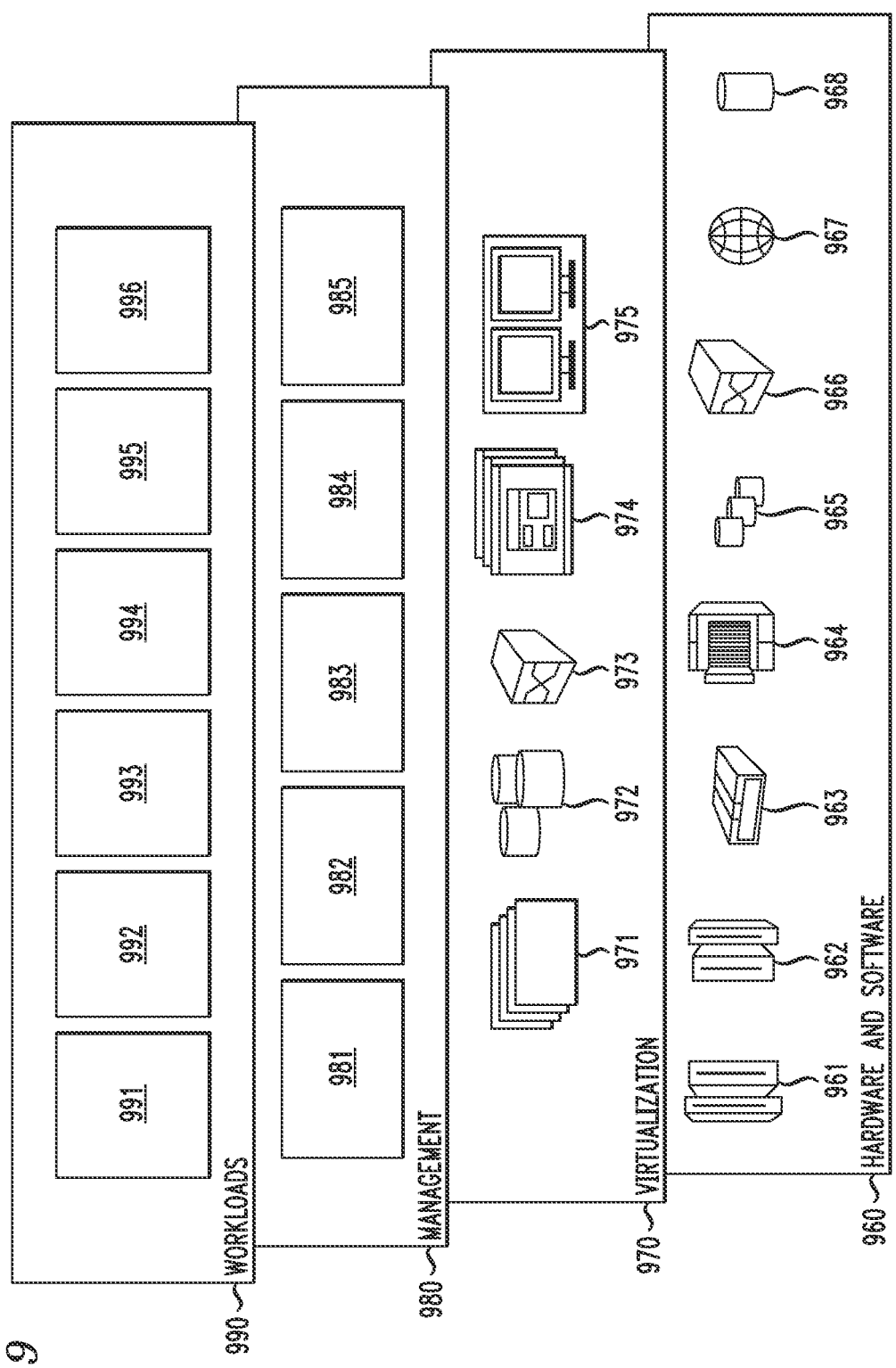
FIG. 9 depicts abstraction model layers according to an illustrative embodiment.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture-based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975. In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and artificial intelligence algorithm (with threshold detection and floating-point computations) processing 996, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, a framework (e.g., a set of one or more framework configurations) that replaces the complex manual (e.g., custom-built) development of model restoration logic. As illustratively described herein, the framework is configured and instantiated with a set of failure detection components and associated model restoration pipelines. Once instantiated, the framework plugs into a given lifecycle using logs as inputs and delivers new model artifacts for a new model version into the existing lifecycle pipelines. In one or more illustrative embodiments, the framework is a cloud-based framework and platform for end-to-end development and lifecycle management of AI applications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a floating-point computation unit configured to perform a dot-product operation in accordance with a first floating-point value and a second floating-point value; and
    detection logic operatively coupled to the floating-point computation unit, the detection logic being operatively coupled to an enabling switch of the floating-point computation unit;
    wherein the detection logic is configured to compute a difference between fixed-point summations of exponent parts of the first floating-point value and the second floating-point value and, based on the computed difference, detect the presence of a condition prior to completion of the dot-product operation by the floating-point computation unit;
    wherein, in response to detection of the presence of the condition, the detection logic is further configured to provide a control signal to the enabling switch of the floating-point computation unit which causes the floating-point computation unit to avoid performing a subset of computations otherwise performed as part of the dot-product operation.

2. The system of claim 1, wherein the condition detected is whether a result of the computation of the difference between fixed-point summations of exponent parts of the first floating-point value and the second floating-point value is below a threshold value.

3. The system of claim 2, wherein the threshold value is one of a positive value and zero.

4. The system of claim 2, wherein the presence of the detected condition serves as a predictor that the avoided subset of computations would have resulted in a dot product of the first floating-point value and the second floating-point value being below the threshold value.

5. The system of claim 1, further comprising a voltage scaling controller operatively coupled to the detection logic and configured to reduce an operating voltage of the detection logic proportionate to a processing delay associated with the floating-point computation unit.

6. The system of claim 1, wherein the dot-product operation is part of a training stage for a neural network model used in an artificial intelligence system.

7. The system of claim 1, wherein the system is implemented as part of one or more integrated circuits.

8. An apparatus comprising:
    at least one processor;
    at least one memory including instruction code;
    the at least one memory and the instruction code being configured to, with the at least one processor, cause the apparatus at least to:
    compute a difference between fixed-point summations of exponent parts of a first floating-point value and a second floating-point value;
    detect, based on the computed difference, the presence of a condition prior to completion of a dot-product operation by a floating-point computation unit configured to perform a dot-product operation in accordance with the first floating-point value and the second floating-point value; and
    provide a control signal, in response to detection of the presence of the condition, to an enabling switch of the floating-point computation unit, the control signal causing the floating-point computation unit to avoid performing a subset of computations otherwise performed as part of the dot-product operation.

9. The apparatus of claim 8, wherein the condition detected is whether a result of the computation of the difference between fixed-point summations of exponent parts of the first floating-point value and the second floating-point value is below a threshold value.

10. The apparatus of claim 9, wherein the threshold value is one of a positive value and zero.

11. The apparatus of claim 9, wherein the presence of the detected condition serves as a predictor that the avoided subset of computations would have resulted in a dot product of the first floating-point value and the second floating-point value being below the threshold value.

12. The apparatus of claim 9, wherein the difference between fixed-point summations of exponent parts of the first floating-point value and the second floating-point value is represented as $$\sum_{k \in S_p}^{N} 2^{(ex_i + ey_i + 2)} - \sum_{k \in S_n}^{N} 2^{(ex_i + ey_i)},$$

wherein $ex_i$ represents the exponent part of one of the first floating-point value and the second floating-point value, $ey_i$ represents the exponent part of the other of the first floating-point value and the second floating-point value, N represents the number of components that comprise the exponent parts, Sp represents a positive product group, and Sn represents a negative product group.

13. The apparatus of claim 8, wherein the dot-product operation is part of a training stage for a neural network model used in an artificial intelligence system.

14. A method, comprising steps of:
    computing a difference between fixed-point summations of exponent parts of a first floating-point value and a second floating-point value;

detecting, based on the computed difference, the presence of a condition prior to completion of a dot-product operation by a floating-point computation unit configured to perform a dot-product operation in accordance with the first floating-point value and the second floating-point value; and providing a control signal, in response to detection of the presence of the condition, to an enabling switch of the floating-point computing unit, the control signal causing the floating-point computation unit to avoid performing a subset of computations otherwise performed as part of the dot-product operation;

wherein one or more of the steps are executed by processing circuitry configured to execute instruction code.

15. The method of claim 14, wherein the condition detected is whether a result of the computation of the difference between fixed-point summations of exponent parts of the first floating-point value and the second floating-point value is below a threshold value.

16. The method of claim 15, wherein the threshold value is one of a positive value and zero.

17. The method of claim 15, wherein the presence of the detected condition serves as a predictor that the avoided subset of computations would have resulted in a dot product of the first floating-point value and the second floating-point value being below the threshold value.

18. The method of claim 15, wherein the difference between fixed-point summations of exponent parts of the first floating-point value and the second floating-point value is represented as $$\sum_{k \in S_p}^{N} 2^{(ex_i + ey_i + 2)} - \sum_{k \in S_n}^{N} 2^{(ex_i + ey_i)},$$

wherein $ex_i$ represents the exponent part of one of the first floating-point value and the second floating-point value, $ey_i$ represents the exponent part of the other of the first floating-point value and the second floating-point value, N represents the number of components that comprise the exponent parts, Sp represents a positive product group, and Sn represents a negative product group.

19. The method of claim 14, wherein the dot-product operation is part of a training stage for a neural network model used in an artificial intelligence system.

20. An article of manufacture comprising a non-transitory computer-readable storage medium having embodied therein executable instruction code that when executed by a processor causes the processor to perform steps of:

computing a difference between fixed-point summations of exponent parts of a first floating-point value and a second floating-point value;

detecting, based on the computed difference, the presence of a condition prior to completion of a dot-product operation by a floating-point computation unit configured to perform a dot-product operation in accordance with the first floating-point value and the second floating-point value; and providing a control signal, in response to detection of the presence of the condition, to an enabling switch of the floating-point computation unit, the control signal causing the floating-point computation unit to avoid performing a subset of computations otherwise performed as part of the dot-product operation.

21. The article of claim 20, wherein the condition detected is whether a result of the computation of the difference between fixed-point summations of exponent parts of the first floating-point value and the second floating-point value is below a threshold value.

22. The article of claim 21, wherein the presence of the detected condition serves as a predictor that the avoided subset of computations would have resulted in a dot product of the first floating-point value and the second floating-point value being below the threshold value.

23. A system comprising:

a rectified linear unit;

a floating-point computation unit operatively coupled to the rectified linear unit and configured to perform a dot-product operation in accordance with a first floating-point value and a second floating-point value; and detection logic operatively coupled to the floating-point computation unit;

wherein the detection logic is configured to compute a difference between fixed-point summations of exponent parts of the first floating-point value and the second floating-point value and, based on the computed difference, detect the presence of a condition prior to completion of the dot-product operation by the floating-point computation unit by comparing the computed difference to a threshold value;

wherein, in response to the computed difference being below the threshold value, the detection logic is further configured to cause the floating-point computation unit to avoid performing a subset of computations otherwise performed as part of the dot-product operation and to cause the rectified linear unit to control an output of the floating-point computation unit.

24. The system of claim 23, wherein the system is implemented as part of an artificial intelligence system.

25. The system of claim 23, wherein the system is implemented as part of one or more integrated circuits.

* * * * *